(Model.)
F. LEETE & W. C. WILBUR.
BUTTER CASE.
No. 275,225. Patented Apr. 3, 1883.
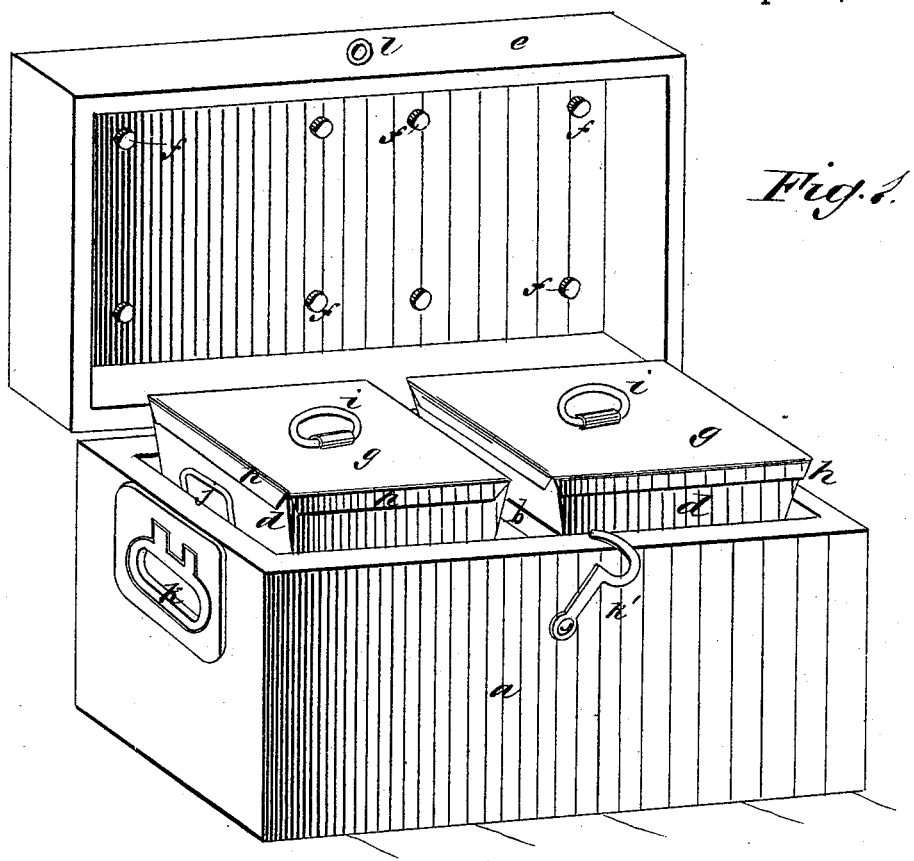
Fig. 1.
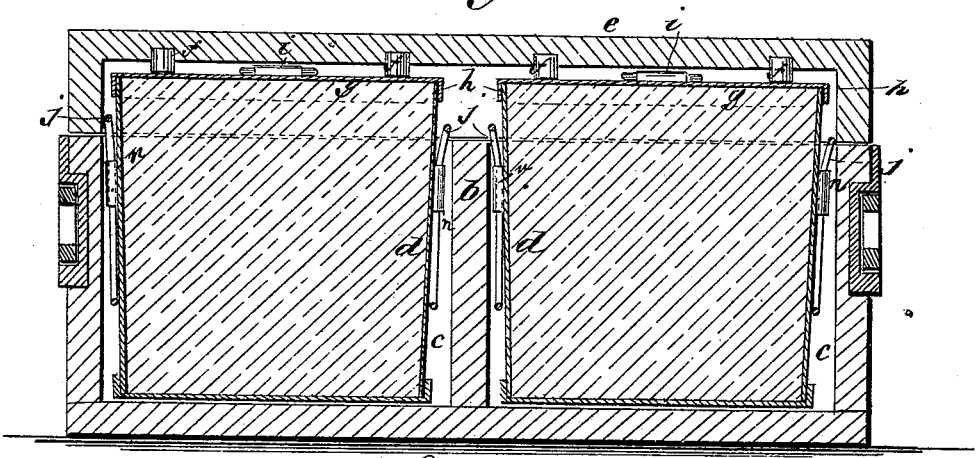
Fig. 2.
Fig. 3.
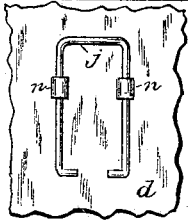
WITNESSES:
Francis McArdle
C. Sedgwick
INVENTOR:
F. Leete
W. C. Wilbur
BY Munn & Co
ATTORNEYS.

UNITED STATES PATENT OFFICE.

FRANK LEETE AND WILLIAM C. WILBUR, OF MAPLETON, IOWA.

BUTTER-CASE.

SPECIFICATION forming part of Letters Patent No. 275,225, dated April 3, 1883.

Application filed August 9, 1882. (Model.)

*To all whom it may concern:*

Be it known that we, FRANK LEETE and WILLIAM C. WILBUR, both of Mapleton, in the county of Monona and State of Iowa, have invented a new and useful Improvement in Butter-Cases, of which the following is a full, clear, and exact description.

Our invention consists of a butter-case provided on two of its opposite sides with vertical sockets for the reception of handles adapted to slide up and down in said sockets, as hereinafter more fully set forth.

Reference is to be had to the accompanying drawings, forming part of this specification, in which similar letters of reference indicate corresponding parts in all the figures.

Figure 1 is a perspective view of our improved butter-package, the cover of the exterior case being raised. Fig. 2 is a longitudinal sectional elevation through the exterior case and the butter-packages. Fig. 3 is a detail view, showing the construction of one of the sliding handles applied to one side of the butter-case.

We make a transportation-case, $a$, of wood or other approved material, with one or more partitions, $b$, separating the interior into cells $c$, in which to place the butter tubs or cases $d$, to be made of metal, glass, porcelain, stone, or any other material that the butter will not destroy, the cover $e$ of the outer case being hinged to it and provided with rubber or other cushions, $f$, on the inside to press down on the covers $g$ of the butter-cases $d$ when closed and fastened, so as to confine the butter-cases and prevent them from shaking about in transit.

The butter-case covers will preferably close over the tops of the cases by a flange, $h$, and they will have a handle, $i$, to lift them off. The cases $d$ are provided with sliding handles $j$ at the sides for lifting out and in the case $a$.

Two of the opposite sides of a butter-case $d$ are each provided with two vertical sockets, $n$, for the reception of the opposite longitudinal sides of the sliding handles $j$. Each handle $j$ is formed of a rectangular metallic rod broken away at the middle of its lower end, bent twice right-angularly at its upper end to form the top of the handle $j$, and the two longitudinal sides of the handle parallel with each other, which are inserted in the sockets $n$, and the lower ends of the longitudinal sides of the handle bent inwardly at right angles to the longitudinal sides to prevent the latter from being drawn out of the socket $n$ when the handles are slid up to manipulate the butter-cases, the handles being slid down when the cases are inserted in the outer case, so as not to interfere with the closing of the hinged cover $e$. The outer case will have drop chest-handles $k$ at the ends for convenience of handling it, and the cover $e$ will be fastened by a hook-hasp, $k'$, and staple or eye stud $l$, or equivalent devices.

It will be observed that the butter-cases are surrounded by air-spaces between them and the walls of the outer case, which protects the butter from the heat while in transit and while the outer case is exposed to the sun.

Having thus described our invention, what we claim as new, and desire to secure by Letters Patent, is—

The combination, with the butter-case $d$, provided on two of its opposite sides with the vertical sockets $n$, of the handles $j$, adapted to slide up and down in said sockets, substantially as described.

FRANK LEETE.
WILLIAM C. WILBUR.

Witnesses:
CHAS. J. WHITING,
ED. QUICK.